(12) United States Patent  
Mori

(10) Patent No.: US 12,531,245 B2  
(45) Date of Patent: Jan. 20, 2026

(54) LITHIUM-ION SECONDARY BATTERY

(71) Applicant: TDK Corporation, Tokyo (JP)

(72) Inventor: Takashi Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 766 days.

(21) Appl. No.: 17/898,565

(22) Filed: Aug. 30, 2022

(65) Prior Publication Data

US 2023/0080975 A1 Mar. 16, 2023

(30) Foreign Application Priority Data

Sep. 2, 2021 (JP) ................................ 2021-142873

(51) Int. Cl.
| | |
|---|---|
| *H01M 4/62* | (2006.01) |
| *H01M 4/38* | (2006.01) |
| *H01M 4/48* | (2010.01) |
| *H01M 4/587* | (2010.01) |
| *H01M 10/0525* | (2010.01) |
| *H01M 10/0568* | (2010.01) |
| *H01M 10/0569* | (2010.01) |
| *H01M 4/02* | (2006.01) |

(52) U.S. Cl.
CPC ........... *H01M 4/622* (2013.01); *H01M 4/386* (2013.01); *H01M 4/483* (2013.01); *H01M 4/587* (2013.01); *H01M 4/625* (2013.01); *H01M 10/0525* (2013.01); *H01M 10/0568* (2013.01); *H01M 10/0569* (2013.01); *H01M 2004/027* (2013.01); *H01M 2300/0037* (2013.01)

(58) Field of Classification Search
CPC ........................ H01M 4/625; H01M 2004/027
See application file for complete search history.

(56) References Cited

U.S. PATENT DOCUMENTS

| | | | |
|---|---|---|---|
| 5,531,871 A | 7/1996 | Fauteux et al. | |
| 5,538,655 A | 7/1996 | Fauteux et al. | |
| 7,550,232 B2 * | 6/2009 | Kato ..................... | H01M 4/133 429/231.95 |
| 2005/0244711 A1 | 11/2005 | Fukui et al. | |
| 2015/0073091 A1 | 3/2015 | Harada et al. | |
| 2018/0201814 A1 | 7/2018 | Harada et al. | |
| 2019/0051902 A1 | 2/2019 | Zhamu et al. | |

(Continued)

FOREIGN PATENT DOCUMENTS

| | | |
|---|---|---|
| EP | 3590972 A1 | 1/2020 |
| JP | 2005-306917 A | 11/2005 |

(Continued)

OTHER PUBLICATIONS

Machine translation of JP 2015-191866 (no date) (Year: 0000).*

*Primary Examiner* — Amanda C. Walke
(74) *Attorney, Agent, or Firm* — XSENSUS LLP

(57) ABSTRACT

A lithium-ion secondary battery containing: a positive electrode; a negative electrode; a separator between the positive electrode and the negative electrode; and an electrolyte, in which the negative electrode may contain silicon or a silicon compound, a binder, and a carbon nanotube, the binder may contain a compound having a structure in which a linear molecule penetrates a cyclic molecule, and the electrolyte may contain an electrolytic salt containing one or more elements selected from the group consisting of boron, carbon, nitrogen, oxygen, and sulfur.

17 Claims, 2 Drawing Sheets

(56) References Cited

U.S. PATENT DOCUMENTS

| | | | |
|---|---|---|---|
| 2019/0051904 A1 | 2/2019 | Zhamu et al. | |
| 2019/0051905 A1 | 2/2019 | Zhamu et al. | |
| 2019/0207209 A1 | 7/2019 | Venkatachalam et al. | |
| 2019/0393496 A1 | 12/2019 | He et al. | |
| 2020/0067049 A1 | 2/2020 | Lee et al. | |
| 2020/0112027 A1 | 4/2020 | Choi et al. | |
| 2021/0384487 A1 | 12/2021 | Ansari et al. | |
| 2022/0102713 A1 | 3/2022 | Ansari et al. | |
| 2022/0115651 A1 | 4/2022 | Ansari et al. | |
| 2022/0166024 A1* | 5/2022 | Harada | C08B 37/0015 |

FOREIGN PATENT DOCUMENTS

| | | | | |
|---|---|---|---|---|
| JP | 2009-120759 A | | 6/2009 | |
| JP | 2015-189972 A | | 11/2015 | |
| JP | 2015191866 A | * | 11/2015 | .......... H01M 10/052 |
| JP | 2016-89175 A | | 5/2016 | |
| JP | 2018049725 A | * | 3/2018 | |
| JP | 2018-111788 A | | 7/2018 | |
| JP | 2018-116831 A | | 7/2018 | |
| JP | 2018-174038 A | | 11/2018 | |
| JP | 2020-145193 A | | 9/2020 | |
| JP | 2021-508932 A | | 3/2021 | |
| WO | 2004/004031 A1 | | 1/2004 | |
| WO | 2013/162019 A1 | | 10/2013 | |
| WO | 2018/159791 A1 | | 9/2018 | |
| WO | 2019/093443 A1 | | 5/2019 | |
| WO | 2020/079819 A1 | | 4/2020 | |

\* cited by examiner

LITHIUM-ION SECONDARY BATTERY

CROSS-REFERENCE TO RELATED APPLICATION

Priority is claimed on Japanese Patent Application No. 2021-142873 filed on Sep. 2, 2021, the content of which is incorporated herein by reference in its entirety.

BACKGROUND

The present disclosure relates to a lithium-ion secondary battery.

Lithium-ion secondary batteries are widely used also as a power source for mobile devices such as mobile phones and laptop computers and hybrid cars.

The capacity of a lithium-ion secondary battery mainly depends on an active material of an electrode. Graphite is generally used as a negative electrode active material, but a negative electrode active material having a higher capacity is required. Therefore, silicon (Si), which has a much larger theoretical capacity than the theoretical capacity (372 mAh/g) of graphite, is attracting attention.

A negative electrode active material containing Si is accompanied by a large volume expansion during charging. The volume expansion of the negative electrode active material cause disconnection of a conductive paths between negative electrode active materials and peeling at the interface between a negative electrode active material layer and a current collector, thereby degrading the cycle characteristics of the battery.

In order to improve the cycle characteristics of the battery, a high-strength binder may be used for the negative electrode active material layer. For example, Patent Document 1 discloses a lithium-ion secondary battery using polyimide as a binder.

Furthermore, Patent Document 2 discloses that a binder in which the main chain of a polymer penetrates at least a part of a cyclic host group is used in a lithium-ion secondary battery.

PATENT DOCUMENTS

[Patent Document 1] PCT International Publication No. WO2004/004031
[Patent Document 2] Japanese Unexamined Patent Application, First Publication No. 2020-145193

SUMMARY

Further improvement of cycle characteristics is required.

Some embodiments of the present disclosure have been made in view of the above-mentioned problems, and an object thereof is to provide a lithium-ion secondary battery having excellent cycle characteristics.

The following aspect is provided to achieve the above-mentioned object.

(1) A lithium-ion secondary battery according to a first aspect contains: a positive electrode; a negative electrode; a separator between the positive electrode and the negative electrode; and an electrolyte, in which the negative electrode contains silicon or a silicon compound, a binder, and a carbon nanotube, the binder contains a compound having a structure in which a linear molecule penetrates a cyclic molecule, and the electrolyte contains an electrolytic salt containing one or more elements selected from the group consisting of boron, carbon, nitrogen, oxygen, and sulfur.

(2) In the lithium-ion secondary battery according to the above-mentioned aspect, the cyclic molecule may be cyclodextrin or a cyclodextrin derivative.

(3) In the lithium-ion secondary battery according to the above-mentioned aspect, the electrolytic salt may include lithium bis(fluorosulfonyl)imide (LiFSA), lithium bis(trifluoromethanesulfonyl)imide (LiTFSA), lithium difluoro(oxalato)borate (LiDFOB), or lithium bis(oxalato)borate (LiBOB).

(4) In the lithium-ion secondary battery according to the above-mentioned aspect, the electrolytic salt may include lithium bis(fluorosulfonyl)imide (LiFSA) or lithium bis(trifluoromethanesulfonyl)imide (LiTFSA).

The lithium-ion secondary battery according to the above-mentioned aspect has excellent cycle characteristics.

BRIEF DESCRIPTION OF THE DRAWINGS

The scope of the present disclosure is best understood from the following detailed description of exemplary embodiments when read in conjunction with the accompanying drawings.

DETAILED DESCRIPTION

Figure 1:
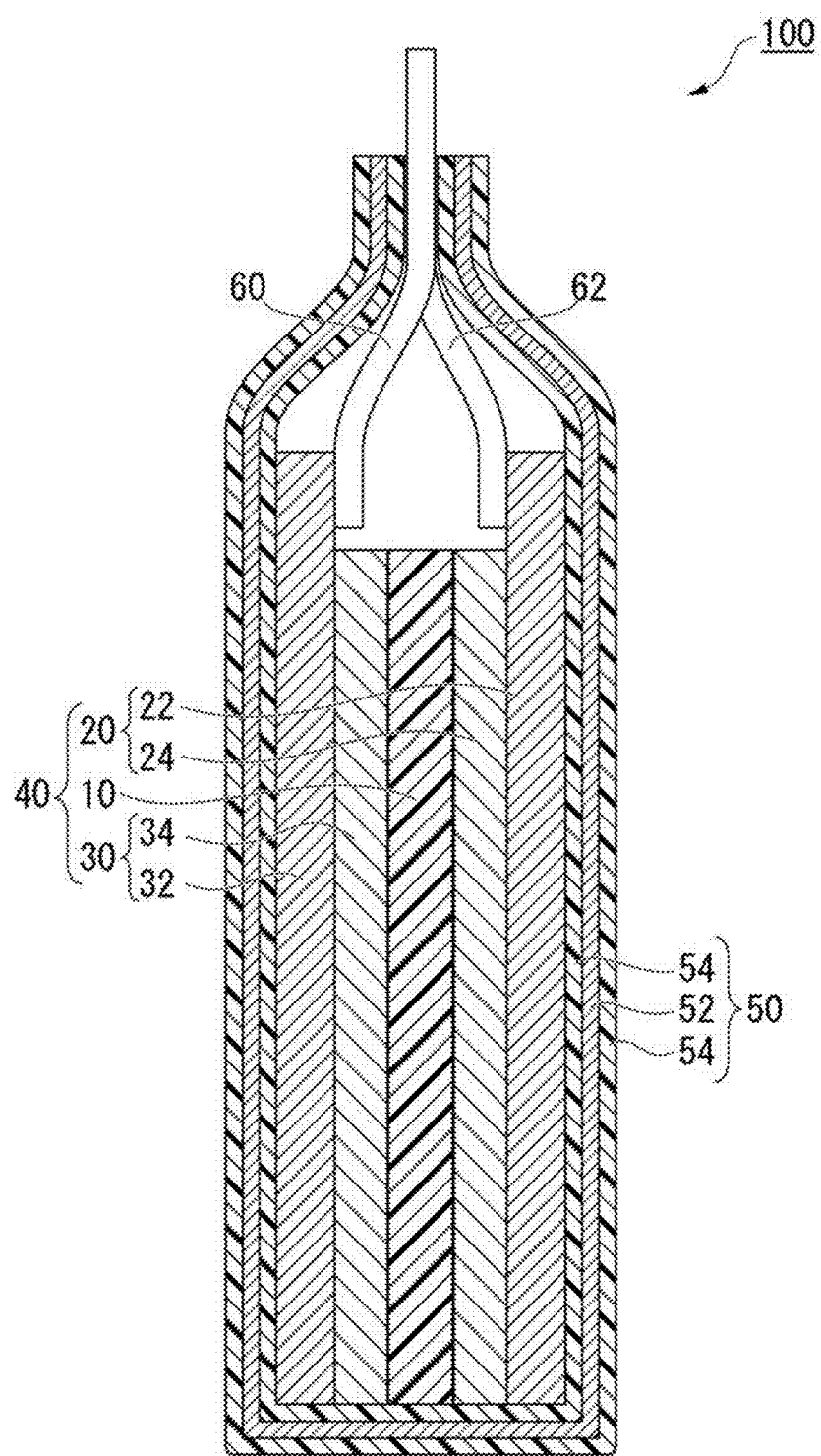
FIG. 1 is a schematic diagram of a lithium-ion secondary battery according to a first embodiment.

Hereinafter, the embodiment will be described in detail with reference to the drawings as appropriate. In the drawings used in the following description, characteristic portions may be shown by enlarging them for convenience to facilitate understanding characteristics, and the dimensional ratios and the like of each of components may be different from those of actual components. Materials, dimensions, and the like in the following description are merely exemplary examples, and the present disclosure is not limited thereto and can be implemented with appropriate changes without departing from the scope thereof "Lithium-Ion Secondary Battery"

FIG. 1 is a schematic diagram of a lithium-ion secondary battery according to a first embodiment. A lithium-ion secondary battery 100 shown in FIG. 1 includes a power generation element 40, an exterior body 50, and a non-aqueous electrolyte. The exterior body 50 covers the periphery of the power generation element 40. The power generation element 40 is connected to outside via a pair of connected terminals 60 and 62 connected to the power generation element 40. The non-aqueous electrolyte is accommodated in the exterior body 50.

(Power Generation Element)

The power generation element 40 includes a separator 10, a positive electrode 20, and a negative electrode 30.

<Positive Electrode>

The positive electrode 20 has a positive electrode current collector 22 and a positive electrode active material layer 24, for example. The positive electrode active material layer 24 is in contact with at least one surface of the positive electrode current collector 22.

[Positive Electrode Current Collector]

The positive electrode current collector 22 is a conductive sheet material, for example. The positive electrode current collector 22 is a thin metal sheet such as aluminum, copper, nickel, titanium, and stainless steel, for example. Aluminum, which is lightweight, is suitably used for the positive electrode current collector 22. The average thickness of the positive electrode current collector 22 is 10 μm or more and 30 μm or less, for example.

[Positive Electrode Active Material Layer]

The positive electrode active material layer 24 contains a positive electrode active material, for example. The positive electrode active material layer 24 may contain a conductive auxiliary agent and a binder as necessary.

The positive electrode active material includes an electrode active material capable of reversibly advancing storage and release of lithium ions, desorption and insertion (intercalation) of lithium ions, or doping and undoping of lithium ions and counter anions.

The positive electrode active material is a composite metal oxide, for example. The composite metal oxide is lithium cobalt oxide ($LiCoO_2$), lithium nickel oxide ($LiNiO_2$), lithium manganese oxide ($LiMnO_2$), lithium manganese spinel ($LiMn_2O_4$), a compound represented by General Formula: $LiNi_xCo_yMn_zM_aO_2$ (where x+y+z+a=1, 0≤x<1, 0≤y<1, 0≤z<1, 0≤a<1, and M is one or more elements selected from the group consisting of Al, Mg, Nb, Ti, Cu, Zn, and Cr), a lithium vanadium compound ($LiV_2O_5$), olivine-type $LiMPO_4$ (where M represents VO or one or more kinds of elements selected from Co, Ni, Mn, Fe, Mg, Nb, Ti, Al, and Zr), lithium titanium oxide ($Li_4Ti_5O_{12}$), and $LiNi_xCo_yAl_zO_2$ (0.9<x+y+z<1.1), for example. The positive electrode active material may be an organic substance. For example, the positive electrode active material may be polyacetylene, polyaniline, polypyrrole, polythiophene, or polyacene.

The positive electrode active material may be a lithium-free material. The lithium-free material is, for example, $FeF_3$, a conjugated polymer containing an organic conductive substance, a Chevrel phase compound, a transition metal chalcogenide, vanadium oxide, and niobium oxide. As the lithium-free material, only one material may be used, or a plurality of materials may be used in combination. In a case where the positive electrode active material is a lithium-free material, discharge is performed first, for example. Lithium is inserted into a positive electrode active material through discharge. Lithium may be chemically or electrochemically pre-doped into a lithium-free material which is a positive electrode active material.

The conductive auxiliary agent enhances the electron conductivity between the positive electrode active materials. The conductive auxiliary agent is, for example, carbon powder, a carbon nanotube, a carbon material, a metal fine powder, a mixture of a carbon material and a metal fine powder, and a conductive oxide. The carbon powder is, for example, carbon black, acetylene black, and ketjen black. The fine metal powder is, for example, a powder of copper, nickel, stainless steel, iron, and the like.

The amount of the conductive auxiliary agent in the positive electrode active material layer 24 is not particularly limited. For example, the amount of the conductive auxiliary agent with respect to the total mass of the positive electrode active material, the conductive auxiliary agent, and the binder is 0.5% by mass or more and 20% by mass or less, and preferably 1% by mass or more and 5% by mass or less.

The binder in the positive electrode active material layer 24 binds the positive electrode active materials to each other. As the binder, a known binder can be used. Furthermore, the binder may be the same as that used for a negative electrode active material layer 34 to be described later. The binder is preferably one that does not dissolve in the electrolyte, has oxidation resistance, and has adhesiveness. The binder is a fluororesin, for example. The binder is, for example, polyvinylidene fluoride (PVDF), polytetrafluoroethylene (PTFE), polyamide (PA), polyimide (PI), polyamideimide (PAI), polybenzimidazole (PBI), polyethersulfone (PES), polyacrylic acid and a copolymer thereof, metal ion cross-linked products of polyacrylic acid and a copolymer thereof, polypropylene (PP) or polyethylene (PE) grafted with maleic anhydride, and a mixture thereof. PVDF is particularly preferable as the binder used for the positive electrode active material layer.

The amount of the binder in the positive electrode active material layer 24 is not particularly limited. For example, the amount of the binder with respect to the total mass of the positive electrode active material, the conductive auxiliary agent, and the binder is 1% by mass or more and 15% by mass or less, and preferably 1.5% by mass or more and 5% by mass or less. When the amount of the binder is too low, the adhesive strength of the positive electrode 20 is weakened. When the amount of the binder is high, the energy density of the lithium-ion secondary battery 100 is lowered because the binder is electrochemically inactive and does not contribute to the discharging capacity.

<Negative Electrode>

The negative electrode 30 has a negative electrode current collector 32 and a negative electrode active material layer 34, for example. The negative electrode active material layer 34 is formed on at least one surface of the negative electrode current collector 32.

[Negative Electrode Current Collector]

The negative electrode current collector 32 is a conductive sheet material, for example. The same ones as for the positive electrode current collector 22 can be used for the negative electrode current collector 32.

[Negative Electrode Active Material Layer]

The negative electrode active material layer 34 contains a negative electrode active material, a binder, and a carbon nanotube.

The negative electrode active material contains silicon or a silicon compound. Examples of the silicon compound include a silicon alloy, silicon oxide, and a silicon carbon composite material. For example, the silicon, the silicon compound, and silicon of the silicon carbon composite material may be crystalline or amorphous. The amorphous silicon or the silicon compound can be produced by a melt-spun method, a gas atomization method, or the like.

The silicon alloy is represented by $X_nSi$. X is a cation. Examples of X include Ba, Mg, Al, Zn, Sn, Ca, V, Cr, Mn, Fe, Co, Ni, Cu, Zn, Ge, Y, Zr, Nb, Mo, W, Au, Ti, Na, and K. n satisfies 0≤n≤0.5. The silicon oxide is represented by $SiO_x$. x satisfies 0.5≤x≤2, for example. The silicon oxide may be composed of only $SiO_2$, may be composed of only SiO, or may be a mixture of SiO and $SiO_2$. Furthermore, in the silicon oxide, a part of oxygen may be deficient.

The negative electrode active material may be a composite of silicon or silicon compound. The composite is one in which at least a part of the surface of silicon particles or silicon compound particles are coated with a conductive material. Examples of the conductive material include a carbon material, Al, Ti, Fe, Ni, Cu, Zn, Ag, and Sn. The coating amount of the conductive material on the particles of the silicon or silicon compound is, for example, 0.01% by mass or more and 30% by mass or less, preferably 0.1% by mass or more and 20% by mass or less with respect to the total mass of the composite. The composite can be produced by a mechanical alloying method, a chemical vapor deposition method, a wet method, a method of thermally decomposing a polymer after coating the polymer and carbonizing it, or the like, for example.

The specific surface area of the negative electrode active material obtained by a BET method is 0.5 m²/g or more and 100 m²/g or less, and preferably 1.0 m²/g or more and 20 m²/g or less, for example. When the specific surface area is small, it becomes difficult for Li ions to be inserted and desorbed between the negative electrode active materials. When the specific surface area is large, a large amount of a binder is required for electrode formation, which makes the capacity per unit volume small.

Figure 2:
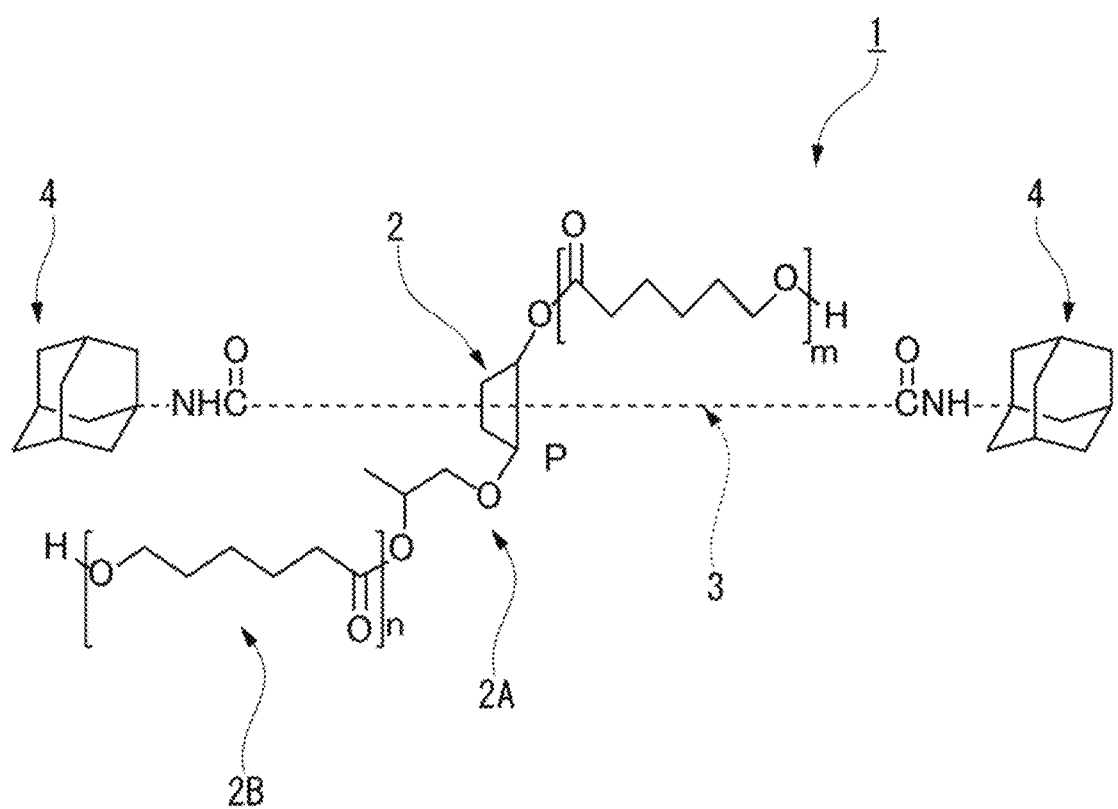
FIG. 2 is a structural diagram of an example of a binder according to the first embodiment.

The binder in the negative electrode active material layer 34 binds the negative electrode active materials to each other. FIG. 2 is a structural diagram of an example of a compound 1 used in the binder according to the first embodiment. The binder contains the compound 1 shown in FIG. 2. The compound 1 is a polymer having a structure in which a linear molecule 3 penetrates a cyclic molecule 2. This compound 1 may have terminal groups 4, which cause steric hindrance to the cyclic molecule 2, at both ends of the linear molecule 3.

The compound 1 shown in FIG. 2 is called polyrotaxane. The compound 1 shown in FIG. 2 is a "SeRM Super Polymer" produced by ASM Inc., and is an example of the polymer having the structure in which the linear molecule 3 penetrates the cyclic molecule 2. In the compound 1 shown in FIG. 2, the linear molecule 3 is polyethylene glycol, the cyclic molecule 2 is cyclodextrin, and the terminal group is an adamantane group. The cyclic molecule 2 shown in FIG. 2 is modified with a hydroxypropyl group 2A, and a caprolactone chain 2B is connected to the hydroxypropyl group 2A.

The linear molecule 3 is not limited to the polyethylene glycol shown in FIG. 2. Examples of the linear molecule 3 include polyethylene glycol, polyethylene oxide, polypropylene glycol, polypropylene oxide, polyolefin resin, polyvinyl alcohol, polyvinylidene fluoride, polyvinylpyrrolidone, poly(meth)acrylic acid, casein, polyester resins, polystyrene resins, acrylic resins, polyvinyl butyral resins, polyisobutylene, polytetrahydrofuran, polyaniline, polyamides, and polyimides. The polyolefin resin is a copolymer resin of polyethylene, polypropylene, or other olefin monomers, for example. The polystyrene resin is a polystyrene or an acrylonitrile-styrene copolymer resin (ABS resin), for example. The acrylic resin is polymethyl methacrylate, a (meth)acrylic acid ester copolymer, or an acrylonitrile-methyl acrylate copolymer resin, for example. The polyamides are nylon, for example.

The terminal group 4 is not limited to the adamantane group shown in FIG. 2. Examples of the terminal group 4 include dinitrophenyl groups, cyclodextrins, adamantane groups, trityl groups, fluorescein groups, silsesquioxane groups, pyrene groups, and benzene groups.

The cyclic molecule 2 is not limited to the cyclodextrin shown in FIG. 2. The cyclic molecule 2 is cyclodextrin or a cyclodextrin derivative, for example. The cyclodextrin derivative is one in which cyclodextrin is modified with any group selected from the group consisting of an isocyanate group, a thioisocyanate group, an oxylan group, an oxetane group, a carbodiimide group, a silanol group, a hydroxypropyl group, an oxazoline group, and an aziridine group. Cyclodextrins modified with these groups can be crosslinked with each other.

The amount of the binder in the negative electrode active material layer 34 is not particularly limited. For example, the amount of the binder with respect to the total mass of the negative electrode active material, the conductive auxiliary agent, and the binder is 1% by mass or more and 15% by mass or less, and preferably 3% by mass or more and 10% by mass or less. When the amount of the binder is low, the adhesive strength of the negative electrode 30 is weakened. When the amount of the binder is high, the energy density of the lithium-ion secondary battery 100 is lowered because the binder is electrochemically inactive and does not contribute to the discharging capacity.

The conductive auxiliary agent in the negative electrode active material layer 34 enhances the electron conductivity between the negative electrode active materials. The conductive auxiliary agent is a carbon nanotube. The carbon nanotube may be a single-walled carbon nanotube (SWCNT), may be a multi-walled carbon nanotube (MWCNT), or may be a mixture thereof. The single-walled carbon nanotube (SWCNT) easily clings to the negative electrode active material, which is a great effect on reinforcing the binder, thereby improving the cycle characteristics of the lithium-ion secondary battery 100. Multi-walled carbon nanotubes (MWCNTs) are inexpensive. The negative electrode active material layer 34 may have another conductive auxiliary agent in addition to the carbon nanotubes. The other conductive auxiliary agent is, for example, acetylene black, and other conductive auxiliary agents similar to those of the positive electrode active material layer 24 can be used.

The amount of the conductive auxiliary agent in the negative electrode active material layer 34 is not particularly limited. For example, the amount of the conductive auxiliary agent with respect to the total mass of the positive electrode active material, the conductive auxiliary agent, and the binder is 5% by mass or more and 20% by mass or less, and preferably 1% by mass or more and 12% by mass or less.

<Separator>

The separator 10 is sandwiched between the positive electrode 20 and the negative electrode 30. The separator 10 separates the positive electrode 20 and the negative electrode 30 from each other and prevents a short circuit between the positive electrode 20 and the negative electrode 30. The separator 10 extends in-plane along the positive electrode 20 and the negative electrode 30. Lithium ions can pass through the separator 10.

The separator 10 has a porous structure having electrical insulation properties, for example. The separator 10 is a monolayer or laminate of a polyolefin film, for example. The separator 10 may be a stretched film of a mixture of polyethylene or polypropylene. The separator 10 may be a fibrous nonwoven fabric made of at least one constituent material selected from the group consisting of cellulose, polyester, polyacrylonitrile, polyamide, polyethylene, and polypropylene. The separator 10 may be a solid electrolyte, for example. The solid electrolyte is a polymer solid electrolyte, an oxide-based solid electrolyte, or a sulfide-based solid electrolyte, for example. The separator 10 may be an inorganic coated separator. The inorganic coated separator is one in which a mixture of a resin such as PVDF and CMC and an inorganic substance such as alumina or silica is applied to the surface of the above-mentioned film. The inorganic coated separator has excellent heat resistance, and suppresses the precipitation of transition metals eluted from the positive electrode on the surface of the negative electrode.

<Electrolyte>

The electrolyte is enclosed in the exterior body 50, and the power generation element 40 is impregnated therewith. The non-aqueous electrolyte has a non-aqueous solvent and an electrolytic salt, for example. The electrolytic salt is dissolved in the non-aqueous solvent.

The solvent is not particularly limited as long as it is a solvent generally used for lithium-ion secondary batteries. For example, the solvent include a cyclic carbonate compound, a chain carbonate compound, a cyclic ester compound, or a chain ester compound. For the solvent, these may be used alone, or these may be mixed in arbitrary ratio and incorporated. Examples of the cyclic carbonate compound include ethylene carbonate (EC) and propylene carbonate (PC). Examples of the chain carbonate compound include diethyl carbonate (DEC), ethyl methyl carbonate (EMC), and dimethyl carbonate (DMC). Examples of the cyclic ester compound include γ-butyrolactone. Examples of the chain ester compound include propyl propionate, ethyl propionate, and ethyl acetate.

The solvent is preferably any one or more of propylene carbonate, ethylene carbonate, diethyl carbonate, dimethyl carbonate, methyl ethyl carbonate, fluoroethylene carbonate, difluoroethylene carbonate, diallyl carbonate, dimethyl 2,5-dioxahexanedioate, diethyl 2,5-dioxahexanedioate, furan, 2,5-dimethylfuran, tetrahydrofuran, 2-methyltetrahydrofuran, tetrahydropyran, 1,3-dioxane, 1,4-dioxane, dimethoxymethane, dimethoxyethane, 1,2-diethoxyethane, diglyme, triglyme, tetraglyme, methyl acetate, ethyl acetate, propyl acetate, isopropyl acetate, butyl acetate, methyl difluoroacetate, ethyl trifluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, γ-butyrolactone, γ-valerolactone, valerolactone, ε-caprolactone, γ-hexanolactone, γ-undecalactone, trimethyl phosphate, triethyl phosphate, tri-n-propyl phosphate, trioctyl phosphate, triphenyl phosphate, methoxy-nonafluorobutane, ethoxy-nonafluorobutane, 1-methoxyheptafluoropropane, 2-trifluoromethyl-3-ethoxydodecafluorohexane, methyl nonafluorobutyl ether, and ethyl nonafluorobutyl ether.

The electrolytic salt is a lithium salt, for example. For example, the electrolytic salt contains one or more elements selected from the group consisting of boron, carbon, nitrogen, oxygen, and sulfur. The electrolytic salt includes lithium bis(fluorosulfonyl)imide (LiFSA), lithium bis(trifluoromethanesulfonyl)imide (LiTFSA), lithium difluoro(oxalato)borate (LiDFOB), or lithium bis(oxalato)borate (LiBOB), for example. The electrolytic salt preferably includes lithium bis(fluorosulfonyl)imide (LiFSA) or lithium bis(trifluoromethanesulfonyl)imide (LiTFSA).

Other electrolytic salts may include $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and the like, of which they particularly preferable include $LiPF_6$. These electrolytic salts prevent oxidative decomposition on the positive electrode side.

<Exterior Body>

The exterior body 50 seals therein the power generation element 40 and the non-aqueous electrolyte. The exterior body 50 restrains the non-aqueous electrolyte from leaking to the outside, and water and the like from invading into the lithium-ion secondary battery 100 from the outside.

As shown in FIG. 1, the exterior body 50 has a metal foil 52, and resin layers 54 laminated on each surface of the metal foil 52, for example. The exterior body 50 is a metal laminate film in which the metal foil 52 is coated from both sides with a polymer film (resin layer 54).

For example, aluminum foil can be used as the metal foil 52. A polymer film such as polypropylene can be used for the resin layer 54. The materials constituting the resin layer 54 may be different between the inner side and the outer side. For example, a polymer having a high melting point such as polyethylene terephthalate (PET) and polyamide (PA) is used as the material of the outer side, and polyethylene (PE), polypropylene (PP), and the like are used as the material of the polymer film on the inner side.

<Terminal>

The terminals 60 and 62 are respectively connected to the negative electrode 30 and the positive electrode 20. The terminal 60 connected to the negative electrode 30 is a negative electrode terminal, and the terminal 62 connected to the positive electrode 20 is a positive electrode terminal. The terminals 60 and 62 are responsible for electrical connection to the outside. The terminals 60 and 62 are formed of a conductive material such as aluminum, nickel, and copper. A connection method may be welding or screwing. It is preferable to protect the terminals 60 and 62 with insulating tape to prevent a short circuit.

"Method for Producing Lithium-Ion Secondary Battery"

The lithium-ion secondary battery 100 is produced by preparing each of the negative electrode 30, the positive electrode 20, the separator 10, the electrolyte, and the exterior body 50, and assembling them. Hereinafter, an example of a method for producing the lithium-ion secondary battery 100 will be described.

The negative electrode 30 is produced by performing a slurry production step, an electrode coating step, a drying step, and a rolling step in this order, for example.

The slurry production step is a step of mixing a negative electrode active material (silicon or a silicon compound), a binder, carbon nanotubes, and a solvent to produce a slurry. The solvent is, for example, water and N-methyl-2-pyrrolidone. The composition ratio of the negative electrode active material, a conductive material, and the binder is preferably 70 wt % to 100 wt %:0 wt % to 10 wt %:0 wt % to 20 wt % in terms of mass ratio. These mass ratios are adjusted so that the total is 100 wt %.

The negative electrode active material may be a composite of active material particles and a conductive material mixed with each other by applying a shear force. When mixing is performed while applying a shear force to the extent that the properties of the active material particles are not changed, the surface of the active material particles is coated with the conductive material. Furthermore, the particle size of the negative electrode active material can be adjusted by the degree of mixing. Furthermore, the negative electrode active material after production may be sieved to make the particle size uniform.

The electrode coating step is a step of coating the surface of the negative electrode current collector 32 with the slurry. The coating method with the slurry is not particularly limited. For example, a slit die coat method or a doctor blade method can be used as the coating method with the slurry.

The drying step is a step of removing the solvent from the slurry. For example, the negative electrode current collector 32 to which the slurry has been applied is dried in the atmosphere of 80° C. to 150° C. As the slurry dries, the negative electrode active material layer 34 is formed on the negative electrode current collector 32.

The rolling step is performed as necessary. The rolling step is a step of applying pressure to the negative electrode active material layer 34 to adjust the density of the negative electrode active material layer 34. The rolling step is performed by a roll press device or the like, for example.

The positive electrode 20 can be produced by the same procedure as that of the negative electrode 30. As the separator 10 and the exterior body 50, commercially available ones can be used.

Next, lamination is performed such that the separator 10 is positioned between the prepared positive electrode 20 and the negative electrode 30 to produce the power generation element 40. In a case where the power generation element 40 is a wound body, the positive electrode 20, the negative electrode 30, and the separator 10 are wound around one end side of them as an axis.

Finally, the power generation element 40 is enclosed in the exterior body 50. A non-aqueous electrolyte is injected into the exterior body 50. The non-aqueous electrolyte is impregnated into the power generation element 40 by performing pressure reduction, heating, and the like after injecting the non-aqueous electrolyte. The exterior body 50 is sealed by applying heat or the like, and thereby the lithium-ion secondary battery 100 can be obtained. Instead of injecting the electrolyte into the exterior body 50, the power generation element 40 may be impregnated with the electrolyte.

The lithium-ion secondary battery 100 according to the first embodiment has excellent cycle characteristics. It is thought that the reason for this is because the negative electrode active material layer 34 contains the compound, which has the structure in which the linear molecule penetrates the cyclic molecule, and the carbon nanotubes, and the electrolyte contains an electrolytic salt containing one or more elements selected from the group consisting of boron, carbon, nitrogen, oxygen, and sulfur.

The polymer having the structure in which the linear molecule penetrates the cyclic molecule is bound to the negative electrode active material. When the volume of the negative electrode active material expands, an external force is applied to the polymer. When the external force is applied to the polymer, the cyclic molecule moves in a linear polymer chain, thereby preventing excessive elongation of the linear molecule. Because the polymer does not stretch excessively, excessive expansion and contraction of the negative electrode active material to which the polymer clings is suppressed.

Meanwhile, because a force generated in the negative electrode active material during the expansion and contraction of the silicon or silicon compound is about several GPa while the strength of the polymer is about several tens of MPa, the expansion and contraction of the silicon or silicon compound cannot be sufficiently suppressed with only the polymer alone. When carbon nanotubes are mixed in the binder, the carbon nanotubes become a reinforcing material, and the carbon nanotubes increase the strength of the binder. When the strength of the binder is sufficiently high, the peeling between the negative electrode active materials and between the negative electrode active material layer and the current collector is prevented even at the time of the expansion and contraction of the silicon or silicon compound.

Furthermore, the electrolytic salt containing one or more elements selected from the group consisting of boron, carbon, nitrogen, oxygen, and sulfur has higher decomposition efficiency as compared to $LiPF_6$, which is generally used as an electrolytic salt, and thereby a strong Solid Electrolyte Interface (SEI) coat is formed on the surface the negative electrode active material layer 34. The strong coat prevents peeling between the negative electrode active materials and between the negative electrode active material layer and the current collector due to the volume expansion of the negative electrode active material. Furthermore, the strong coat is not destroyed by the volume expansion of the negative electrode active material, thereby preventing a new active surface from being generated on the surface of the negative electrode active material. When the active surface and the electrolyte come into contact with each other, the electrolyte is decomposed, which deteriorates the cycle characteristics of the battery.

As described above, by combining a plurality of factors, the lithium-ion secondary battery 100 according to the first embodiment can exhibit sufficient cycle characteristics even in the case of a silicon negative electrode having a large volume expansion.

Although the embodiments of the present disclosure have been described in detail with reference to the drawings, each of the configurations, combinations thereof, and the like in each of the embodiments is an example, and additions, omissions, replacements, and other changes of the configuration are possible within a range not deviating from the gist of the present disclosure.

EXAMPLE

Example 1

A positive electrode slurry was coated to one surface of an aluminum foil having the thickness of 15 μm. The positive electrode slurry was produced by mixing a positive electrode active material, a conductive auxiliary agent, a binder, and a solvent.

$Li_xCoO_2$ was used as the positive electrode active material. Acetylene black was used as the conductive auxiliary agent. Polyvinylidene fluoride (PVDF) was used as the binder. N-methyl-2-pyrrolidone was used as the solvent. 97 parts by mass of the positive electrode active material, 1 part by mass of the conductive auxiliary agent, 2 parts by mass of the binder, and 70 parts by mass of the solvent were mixed to produce the positive electrode slurry. The amount of the positive electrode active material supported on a positive electrode active material layer after drying was 25 mg/cm². The solvent was removed from the positive electrode slurry in a drying furnace to prepare the positive electrode active material layer. The positive electrode active material layer was pressed with a roll press to produce a positive electrode.

Subsequently, a negative electrode slurry was coated to one surface of a copper foil having the thickness of 10 μm. The negative electrode slurry was produced by mixing a negative electrode active material, a conductive auxiliary agent, a binder, and a solvent.

The negative electrode active material was silicon having the particle size of 3 μm. As the conductive auxiliary agent, acetylene black, a single-walled carbon nanotube (SWCNT), and a multi-walled carbon nanotubes (MWCNT) were used. A crosslinked rotaxane was used as the binder. As the crosslinked rotaxane, SH3400M of "SeRM Super Polymer" produced by ASM Inc. was used (refer to FIG. 2). In the crosslinked rotaxane, a linear molecule was polyethylene glycol, terminal groups were adamantanamine, and a cyclic molecule was polycaprolactone-graft-α-cyclodextrin.

N-methyl-2-pyrrolidone was used as the solvent. 90 parts by mass of the negative electrode active material, 5 parts by mass of the conductive auxiliary agent, and 5 parts by mass of the binder were mixed with N-methyl-2-pyrrolidone to produce the negative electrode slurry. The amount of the negative electrode active material supported on a negative electrode active material layer after drying was 2.0 mg/cm². The solvent was removed from the negative electrode slurry in a drying furnace to produce the negative electrode active material layer. The negative electrode active material layer was pressurized with a roll press and thereafter heat-baked at 150° C. or higher for 1 hour in a nitrogen atmosphere.

Subsequently, an electrolyte was produced. As the solvent, one in which mixing was performed such that ethylene carbonate (EC):diethyl carbonate (DEC)=30:70 in terms of volume ratio was used. As an electrolytic salt, $LiPF_6$ and LiFSA were used. The concentration of $LiPF_6$ was 1 mol/L, and the concentration of LiFSA was 0.1 mol/L. In addition, fluoroethylene carbonate (FEC) was added to the electrolyte at 5 wt % as an additive.

(Production of Lithium-Ion Secondary Battery for Evaluation)

The produced negative electrode and positive electrode were laminated via a separator (porous polyethylene sheet) such that the positive electrode active material layer and the negative electrode active material layer faced each other, thereby obtaining a laminate. A nickel negative electrode lead was attached to the negative electrode of the laminate. An aluminum positive electrode lead was attached to the positive electrode of the laminate. The positive electrode lead and the negative electrode lead were welded by an ultrasonic welder. This laminate body was inserted into an exterior body of the aluminum laminate film and heat-sealed except for one peripheral portion to form a closed part. In addition, finally, after injecting the electrolyte into the exterior body, the remaining one portion was sealed with a heat seal while reducing the pressure with a vacuum sealer to produce a lithium-ion secondary battery.

(Measurement of Capacity Retention Rate after 100 Cycles)

The cycle characteristics of the lithium-ion secondary battery were measured. The measurement of the cycle characteristics was performed using a secondary battery charging and discharging test device (produced by HOKUTO DENKO CORPORATION).

Charging was performed until the battery voltage reached 4.4 V with constant current charging at the charging rate of 1.0 C (current value that completes charging in 1 hour when constant current charging is performed at 25° C.), and discharging was performed until the battery voltage reached 3.0 V with constant current discharging at the discharge rate of 1.0 C. The discharging capacity after the completion of charging and discharging was detected to obtain a battery capacity $Q_1$ before the cycle test.

Using the secondary battery charging and discharging test device, the battery for which the battery capacity $Q_1$ was obtained above was again charged until the battery voltage reached 4.4 V with constant current charging at the charging rate of 1.0 C, and discharged until the battery voltage reached 3.0 V with constant current discharging at the discharge rate of 1.0 C. The above-mentioned charging and discharging was counted as one cycle, and 100 cycles of the charging and discharging were performed. Thereafter, the discharging capacity after the completion of 100 cycles of charging and discharging was detected to obtain a battery capacity $Q_2$ after 100 cycles.

From the capacities $Q_1$ and $Q_2$ obtained above, a capacity retention rate E after 100 cycles was obtained. The capacity retention rate E was obtained by $E=Q_2/Q_1\times100$. The capacity retention rate of Example 1 was 90%.

Example 2

Example 2 was different from Example 1 in that the conductive auxiliary agent used for the negative electrode active material layer was acetylene black and a single-walled carbon nanotube (SWCNT). The capacity retention rate was obtained under the same conditions as in Example 1 for other conditions. The results are summarized in Table 1.

Example 3

Example 3 was different from Example 1 in that the conductive auxiliary agent used for the negative electrode active material layer was acetylene black and a multi-walled carbon nanotube (MWCNT). The capacity retention rate was obtained under the same conditions as in Example 1 for other conditions. The results are summarized in Table 1.

Example 4

Example 4 was different from Example 1 in that among the electrolytic salts used in the electrolyte, LiFSA was changed to LiTFSA. The capacity retention rate was obtained under the same conditions as in Example 1 for other conditions. The results are summarized in Table 1.

Example 5

Example 5 was different from Example 1 in that among the electrolytic salts used in the electrolyte, LiFSA was changed to LiDFOB. The capacity retention rate was obtained under the same conditions as in Example 1 for other conditions. The results are summarized in Table 1.

Example 6

Example 6 was different from Example 1 in that among the electrolytic salts used in the electrolyte, LiFSA was changed to LiBOB. The capacity retention rate was obtained under the same conditions as in Example 1 for other conditions. The results are summarized in Table 1.

Example 7

Example 7 was different from Example 1 in that silicon oxide having the particle size of 3 μm was used as the negative electrode active material. The capacity retention rate was obtained under the same conditions as in Example 1 for other conditions. The results are summarized in Table 1.

Example 8

Example 8 was different from Example 1 in that a silicon-carbon composite material having the particle size of 3 μm was used as the negative electrode active material. The capacity retention rate was obtained under the same conditions as in Example 1 for other conditions. The results are summarized in Table 1.

Comparative Example 1

Comparative Example 1 was different from Example 1 in that an electrode was used, which was baked at the temperature of 300° C. or higher for 3 hours or longer, and in which only acetylene black was used as the conductive auxiliary agent used for the negative electrode active material layer, and polyimide (PI) was used as the binder used for the negative electrode active material layer, and only LiPF$_6$ was used as the electrolytic salt used for the electrolyte. That is, carbon nanotubes were not added to the negative electrode active material layer, a predetermined compound was not used as the binder of the negative electrode active material layer, and LiFSA was not added to the electrolytic salt. The capacity retention rate was obtained under the same conditions as in Example 1 for other conditions. The results are summarized in Table 1.

Comparative Example 2

Comparative Example 2 was different from Example 1 in that polyimide (PI) was used as the binder used for the negative electrode active material, and only LiPF$_6$ was used as the electrolytic salt used for the electrolyte. That is, a predetermined compound was not used as the binder of the negative electrode active material layer, and LiFSA was not added to the electrolytic salt. The capacity retention rate was obtained under the same conditions as in Example 1 for other conditions. The results are summarized in Table 1.

Comparative Example 3

Comparative Example 3 was different from Example 1 in that only acetylene black was used as the conductive auxiliary agent used for the negative electrode active material layer, and only LiPF$_6$ was used as the electrolytic salt used for the electrolyte. That is, carbon nanotubes were not added to the negative electrode active material layer, and LiFSA was not added to the electrolytic salt. The capacity retention rate was obtained under the same conditions as in Example 1 for other conditions. The results are summarized in Table 1.

Comparative Example 4

Comparative Example 4 was different from Example 1 in that only acetylene black was used as the conductive auxiliary agent used for the negative electrode active material layer. That is, carbon nanotubes were not added to the negative electrode active material layer. The capacity retention rate was obtained under the same conditions as in Example 1 for other conditions. The results are summarized in Table 1.

TABLE 1

| Active material | | | Conductive auxiliary agent | | | Binder | | Electrolyte | | | Capacity retention rate after 100 cycles [%] |
|---|---|---|---|---|---|---|---|---|---|---|---|
| Si | SiO$_x$ | Si/C | Acetylene black | SWCNT | MWCNT | PI | Crosslinked rotaxane (SH3400M) | Solvent | Electrolytic salt | FEC | |
| Example 1 | ✓ | | | ✓ | ✓ | ✓ | | ✓ | EC/DEC = 3/7 | LiPF$_6$ (1M) + LiFSA (0.1M) | 5 wt % | 90 |
| Example 2 | ✓ | | | ✓ | ✓ | | | ✓ | EC/DEC = 3/7 | LiPF$_6$ (1M) + LiFSA (0.1M) | 5 wt % | 88 |
| Example 3 | ✓ | | | ✓ | | ✓ | | ✓ | EC/DEC = 3/7 | LiPF$_6$ (1M) + LiFSA (0.1M) | 5 wt % | 85 |
| Example 4 | ✓ | | | ✓ | ✓ | ✓ | | ✓ | EC/DEC = 3/7 | LiPF$_6$ (1M) + LiTFSA (0.1M) | 5 wt % | 83 |
| Example 5 | ✓ | | | ✓ | ✓ | ✓ | | ✓ | EC/DEC = 3/7 | LiPF$_6$ (1M) + LiDFOB (0.05M) | 5 wt % | 84 |
| Example 6 | ✓ | | | ✓ | ✓ | ✓ | | ✓ | EC/DEC = 3/7 | LiPF$_6$ (1M) + LiBOB (0.05M) | 5 wt % | 84 |
| Example 7 | | ✓ | | ✓ | ✓ | ✓ | | ✓ | EC/DEC = 3/7 | LiPF$_6$ (1M) + LiFSA (0.1M) | 5 wt % | 92 |
| Example 8 | | | ✓ | ✓ | ✓ | ✓ | | ✓ | EC/DEC = 3/7 | LiPF$_6$ (1M) + LiFSA (0.1M) | 5 wt % | 93 |
| Comparative Example 1 | ✓ | | | ✓ | | | ✓ | | EC/DEC = 3/7 | LiPF$_6$ (1M) | 5 wt % | 77 |
| Comparative Example 2 | ✓ | | | ✓ | ✓ | ✓ | ✓ | | EC/DEC = 3/7 | LiPF$_6$ (1M) | 5 wt % | 80 |
| Comparative Example 3 | ✓ | | | ✓ | | | | ✓ | EC/DEC = 3/7 | LiPF$_6$ (1M) | 5 wt % | 75 |
| Comparative Example 4 | ✓ | | | ✓ | | | | ✓ | EC/DEC = 3/7 | LiPF$_6$ (1M) + LiFSA (0.1M) | 5 wt % | 80 |

In Examples 1 to 7, the capacity retention rate was higher as compared to that in Comparative Examples 1 to 4. That is, the lithium-ion secondary batteries according to Examples 1 to 7 in which the negative electrode active material layer contains a predetermined binder and carbon nanotubes, and the electrolyte contains a predetermined electrolytic salt have excellent cycle characteristics.

EXPLANATION OF REFERENCES

1 Compound
2 Cyclic molecule
3 Linear molecule
4 Terminal group
10 Separator
20 Positive electrode
22 Positive electrode current collector
24 Positive electrode active material layer
30 Negative electrode
32 Negative electrode current collector
34 Negative electrode active material layer
40 Power generation element
50 Exterior body
52 Metal foil
54 Resin layer
60, 62 Terminal
100 Lithium-ion secondary battery

What is claimed is:

1. A lithium-ion secondary battery comprising:
a positive electrode;
a negative electrode;
a separator between the positive electrode and the negative electrode; and
an electrolyte,
wherein the negative electrode contains silicon or a silicon compound, a binder, and a carbon nanotube,
the binder contains a compound having a structure in which a linear molecule penetrates a cyclic molecule,
the electrolyte contains an electrolytic salt containing one or more elements selected from the group consisting of boron, carbon, nitrogen, oxygen, and sulfur, and
the electrolytic salt includes lithium bis(fluorosulfonyl) imide (LiFSA) and the carbon nanotube includes a single-walled carbon nanotube.

2. The lithium-ion secondary battery according to claim 1, wherein the cyclic molecule is cyclodextrin or a cyclodextrin derivative.

3. The lithium-ion secondary battery according to claim 1, wherein an amount of the carbon nanotube with respect to a total mass of the silicon or the silicon compound, the binder, and the carbon nanotube is in a range of 1% by mass or more and 20% by mass or less.

4. The lithium-ion secondary battery according to claim 3, wherein the amount of the carbon nanotube with respect to the total mass of the silicon or the silicon compound, the binder, and the carbon nanotube is in a range of 5% by mass or more and 12% by mass or less.

5. The lithium-ion secondary battery according to claim 1, wherein the negative electrode further contains acetylene black.

6. The lithium-ion secondary battery according to claim 1, wherein the compound having the structure in which the linear molecule penetrates the cyclic molecule has a terminal group at both ends of the linear molecule.

7. The lithium-ion secondary battery according to claim 6, wherein the terminal group is one selected from the group consisting of adamantane groups, dinitrophenyl groups, cyclodextrins, trityl groups, fluorescein groups, silsesquioxane groups, pyrene groups, and benzene groups.

8. The lithium-ion secondary battery according to claim 2, wherein the cyclodextrin derivative is one in which cyclodextrin is modified with at least one group selected from the groups consisting of an isocyanate group, a thioisocyanate group, an oxylan group, an oxetane group, a carbodiimide group, a silanol group, a hydroxypropyl group, an oxazoline group, and an aziridine group.

9. The lithium-ion secondary battery according to claim 1, wherein the linear molecule is one selected from the group consisting of polyethylene glycol, polyethylene oxide, polypropylene glycol, polypropylene oxide, polyolefin resin, polyvinyl alcohol, polyvinylidene fluoride, polyvinylpyrrolidone, poly(meth)acrylic acid, casein, polyester resins, polystyrene resins, acrylic resins, polyvinyl butyral resins, polyisobutylene, polytetrahydrofuran, polyaniline, polyamides, and polyimides.

10. The lithium-ion secondary battery according to claim 1, wherein the compound having the structure in which the linear molecule penetrates the cyclic molecule is polyrotaxane having a formula as below:

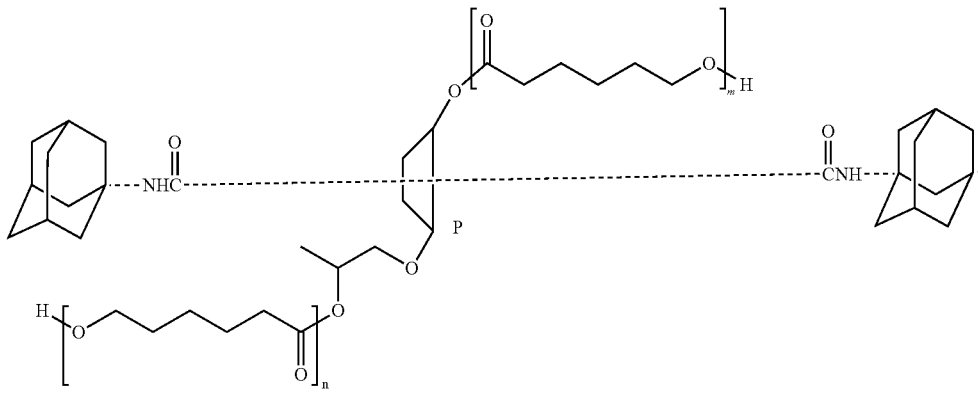

11. The lithium-ion secondary battery according to claim 1, wherein an amount of the binder with respect to a total mass of the silicon or a silicon compound, the binder, and the carbon nanotube is 1% by mass or more and 15% by mass or less.

12. The lithium-ion secondary battery according to claim 11, wherein the amount of the binder with respect to the total mass of the silicon or a silicon compound, the binder, and the carbon nanotube is 3% by mass or more and 10% by mass or less.

13. The lithium-ion secondary battery according to claim 1, wherein the electrolytic salt is a lithium salt.

14. The lithium-ion secondary battery according to claim 1, wherein the electrolyte further comprises one selected from the group consisting of $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$.

15. The lithium-ion secondary battery according to claim 14, wherein the electrolyte further comprises $LiPF_6$.

16. The lithium-ion secondary battery according to claim 1, wherein the electrolyte further comprises a non-aqueous solvent, wherein the electrolytic salt is dissolved in the non-aqueous solvent.

17. The lithium-ion secondary battery according to claim 16, wherein the solvent includes a cyclic carbonate compound, a chain carbonate compound, a cyclic ester compound, or a chain ester compound.

* * * * *